(12) United States Patent
Mason

(10) Patent No.: US 8,251,459 B2
(45) Date of Patent: Aug. 28, 2012

(54) SPOKE WHEEL PROTECTOR

(76) Inventor: Steven Mason, Ontario (CA)

( * ) Notice: Subject to any disclaimer, the term of this patent is extended or adjusted under 35 U.S.C. 154(b) by 0 days.

(21) Appl. No.: 12/800,832

(22) Filed: May 24, 2010

(65) Prior Publication Data

US 2010/0259093 A1 Oct. 14, 2010

Related U.S. Application Data

(62) Division of application No. 12/286,945, filed on Oct. 3, 2008, now abandoned.

(51) Int. Cl.
*B60B 7/00* (2006.01)
(52) U.S. Cl. .......................... 301/58; 301/37.41; 301/104
(58) Field of Classification Search .................. 301/5.21, 301/37.41, 37.372, 37.374, 37.376, 58, 95.101, 301/104
See application file for complete search history.

(56) References Cited

U.S. PATENT DOCUMENTS

| | | | | |
|---|---|---|---|---|
| 4,840,085 A | * | 6/1989 | Nagano | 74/594.4 |
| 6,588,852 B2 | * | 7/2003 | Mason | 301/37.41 |
| 7,018,077 B2 | * | 3/2006 | Mullen | 362/455 |
| 7,140,694 B2 | * | 11/2006 | Mason | 301/37.41 |
| 7,434,891 B2 | * | 10/2008 | Tien | 301/58 |
| 2005/0110333 A1 | * | 5/2005 | Tien | 301/58 |
| 2007/0057566 A1 | * | 3/2007 | Cappellotto | 301/58 |
| 2007/0080577 A1 | * | 4/2007 | Fioravanti | 301/104 |

* cited by examiner

*Primary Examiner* — Kip T Kotter
(74) *Attorney, Agent, or Firm* — Lewis M. Brande; Thomas A McCleary; Brande & McCleary

(57) ABSTRACT

A Spoke Seal Protector that comprises a visually pleasing outer shape with an internal cavity, where the internal cavity has a lower portion shaped complimentary to the industry standard wheel adjusters on the wheel spokes of either motorcycles, bicycles, or other motor conveyances using spoked wheels. The Spoke Seal Protector is adhered onto the spoke adjustor and the internal cavity encases the spoke adjuster. Spring clips may be secured on the adjuster nut and frictionally bear against the spoke seal protector, or the spring clips may be secured on the spoke seal protector and frictionally bear against the adjuster nut. The spoke seal protector and adjustor nut may additionally have a knurled surface to provide additional fiction to secure the spoke seal protector to the adjustor nut. A common automotive or industry sealant can also be placed in the lower counterbored portion of the Spoke Seal Protector and "glue" the Spoke Seal Protector to the spoke adjuster nut and additionally create an environmental seal between the components.

1 Claim, 10 Drawing Sheets

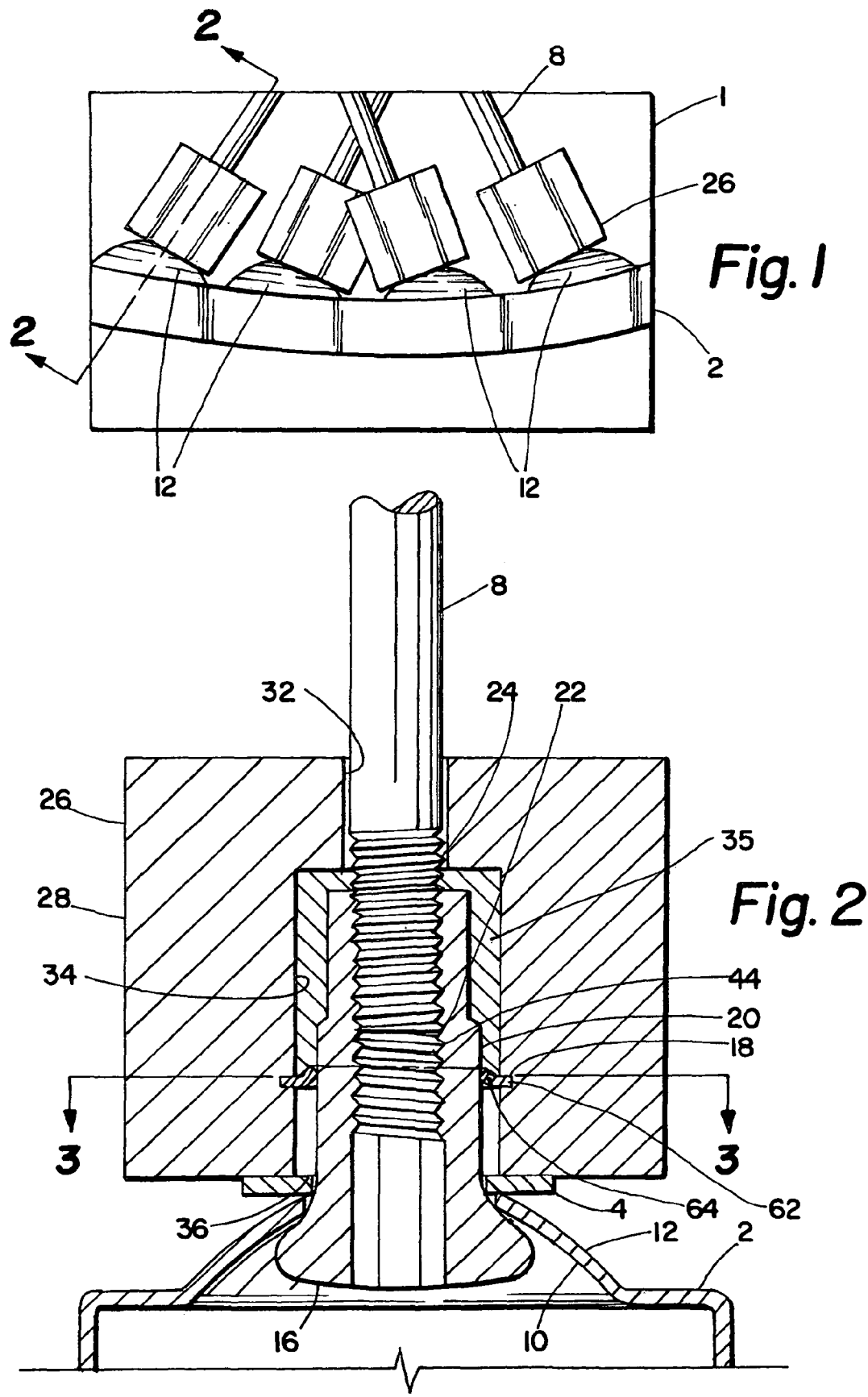

SPOKE WHEEL PROTECTOR

This application is a divisional application Ser. No. 12/286, 945 filed Oct. 3, 2008 now abandoned, and claims priority of the aforementioned patent application under 35 USC §120

BACKGROUND OF THE INVENTION

1. Field of the Invention

This invention is an improvement of U.S. Pat. No. 6,588, 852 by Steven Mason dated Jul. 8, 2003, U.S. Pat. No. 7,140, 694 B2 dated Nov. 28, 2006, and patent application Ser. No. 11/901,168 dated Sep. 27, 2007. This new improved invention relates to a device that protects the spoke adjuster nuts and the wheel rim areas of spoked wheels from the intrusion of foreign objects such as dirt, where the improvement is the addition of a retaining clip similar to internal and/or external e-clips. By adding this device to spoked wheels, they will enhance the functionality of the spoke adjusting areas of the wheel rims by increasing the life span of the spoked wheels and also provide a decorative addition to the spoked wheel.

2. Description of the Prior Art

The use of devices to protect the adjustment areas of wheel spokes is known in the prior art.

U.S. Pat. No. 6,588,852 by Steven Mason (the inventor of the current invention) reveals a wheel spoke adjuster guard that comprises a pleasing outer appearance with an internal cavity complementary to the wheel adjuster nuts on the wheel spokes of a wheel. The adjuster guard has means to lock the guard onto a wheel spoke, preventing unwanted motion.

U.S. Pat. No. 7,140,694 B2 by Steven Mason (the inventor of the current invention) reveals an improvement on the U.S. Pat. No. 6,588,852. This patent reveals a wheel spoke adjuster guard that comprises a pleasing outer appearance with an internal cavity complementary to the wheel adjuster nuts on the wheel spokes of a wheel. The improved adjuster guard is threaded onto a modified spoke adjuster and bears against the tire rim of the vehicle, locking the wheel spoke adjuster guard into place, preventing unwanted motion.

U.S. Pat. No. 4,906,050 by Soder et al., discloses "Beads for Bicycle Wheel Spokes." The principle purpose of this invention is to provide visual and audible effects while the wheel is being used. This invention discloses a bead that is free to move along the length of the spoke, which then creates a pleasing visual effect. This invention is specifically related to the creation of a visual effect and an audible noise.

U.S. Pat. No. 4,695,099 by Klein, discloses a "Wheel Spoke Adjuster Guard." This invention is a two-piece device that is snapped together around the adjuster lug portion of the spoked wheel.

U.S. Pat. No. 2,558,423 by Dobrosky, discloses "A Spoke Ornament for Bicycle Wheels." This device uses tubular sections in unison, where when connected together, have interlocking key areas that prevent any one element from being dislodged from the spoke. This invention is ornamental in concept. When attached to a bicycle wheel, the alternating colors create alternating bands of color while the wheel is moving.

U.S. Pat. No. 2,269,670 by Kieckbusch, discloses a "Balance Weight." This invention is used to balance motorcycle wheels inexpensively, easily and simply.

U.S. Pat. No. 5,801,883 by Peters, discloses "High Visibility Reflective Tubing for Bicycle Wheels." This invention is to create a highly reflective area of a bicycle rim in order to enhance the bicyclist's visibility in low light and bad weather conditions.

U.S. Pat. Nos. 4,906,050, 2,558,423, and 5,801,883 contain no teaching or suggestion that they may be used to attach to the lug area of spoked wheels and prevent the intrusion of foreign materials. They specifically teach the art of either enhancing the visibility of the operator, or making a pleasing sound.

The prior art teachings and patents do not include the retaining devices that have been incorporated into the current invention.

SUMMARY OF THE INVENTION

It is an object of the invention to create a device that can protect the adjusting lug areas, the threaded end of the spoke, and the wheel rim holes of spoked wheel assemblies from the intrusion of foreign materials such as dirt.

The improvement from the previous invention uses a positive retaining system that is either mounted onto the wheel spoke adjuster guard, or mounted onto the wheel adjuster nut.

One retaining system method is to provide a cavity or slot that is shaped to secure the retaining system in the Spoke Seal Protector. The retaining clip would then either frictionally hold the Spoke Seal Protector in place, or a slot within the adjuster nut would positionally lock the Spoke Seal Protector into position.

Another retaining system method is to provide a cavity or slot that is shaped to secure the retaining system onto the adjuster nut. The retaining system would then either frictionally hold the Spoke Seal Protector in place, or a slot within the Spoke Seal Protector would positionally lock the Spoke Seal Protector into position.

Another retaining system method is to shape the adjuster nut and provide a complimentary shape to the Spoke Seal Protector. One shape would be conical, where the base of the cone would face the wheel rim. The Spoke Seal Protector would have a similar shaped cavity, but the base of the cone on the wheel nut would be slightly wider than the ledge of the Spoke Seal Protector, which is formed within the interior portion of the Spoke Seal Protector. An elastomeric, or plastic type of material would assist in securing the Spoke Seal Protector in place by creating a tight secure fit between the Spoke Seal Protector cavity and the adjuster nut shaped portion. A gasket may be placed at the interface between the Spoke Seal Protector and the wheel rim to prevent scuffing damage to the wheel rim, and to provide additional debris and moisture intrusion protection.

Another system that can be incorporated into the design is texturing or knurling a portion of the adjuster nut and the Spoke Seal Protector. This would create a tight frictional interface between the adjuster nut and the Spoke Seal Protector. This texturing can be used alone or with other retaining methods to secure the Spoke Seal Protector.

It is another object of the invention to create an aesthetically pleasing appearance to the spokes and the wheel.

Other objects, advantages, and novel features of the present invention will become apparent from the following detailed description of the invention when considered in conjunction with the drawings accompanying the patent.

BRIEF DESCRIPTION OF THE DRAWINGS

FIG. 1 shows a overall view of the rim, spoke and Spoke Seal Protector.

FIG. 2 shows a cross sectional view of the rim, spoke and Spoke Seal Protector.

DETAILED DESCRIPTION

Figure 3:
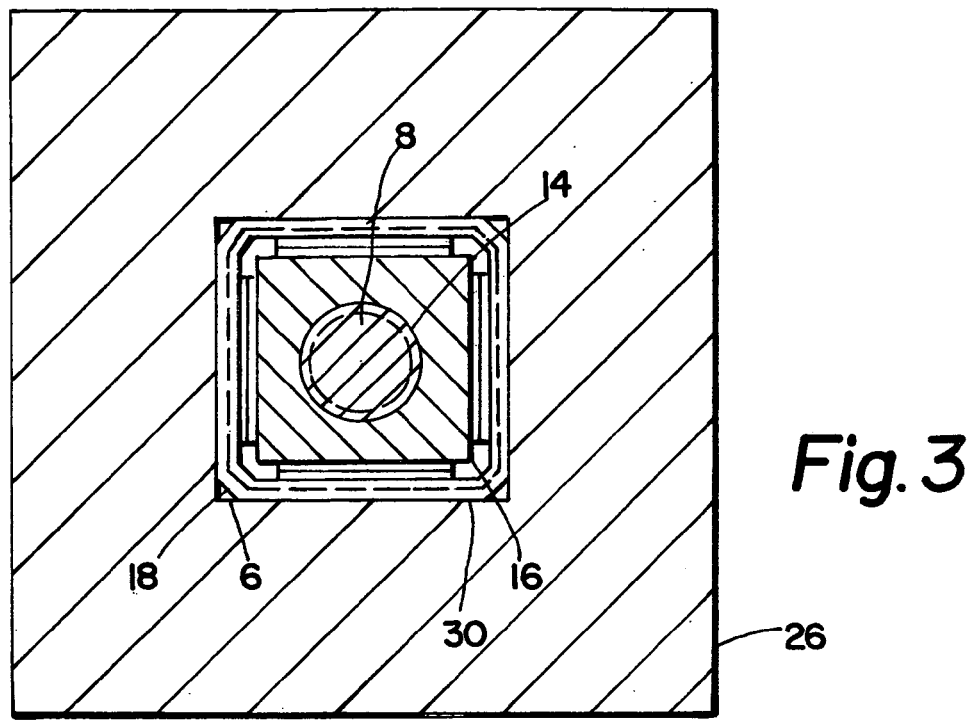
FIG. 3 shows a cross sectional view spoke and Spoke Seal Protector.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

With respect to figures one and two, a wire wheel assembly (1) is shown. Figures one and two reveal the wire wheel assembly (1) and an outer tire mounting rim (2) or wheel rim. The wheel rim (2) has a cross sectional shape that is common in the wheel industry as shown in FIG. 2. The wheel rim (2) has an inner surface (10), where the inner surface (10) is facing towards and oriented at a 90 degree angle to a central plane that is normal to the inner surface (10) of the wheel rim (2). Integrally mounted onto the inner surface (10) of the wheel rim (2) is a first plurality of bearing surfaces (12), which may be spherical in shape. The first plurality of bearing surfaces (12), and hence the inner surface (10) of the wheel rim (2), have a second plurality of holes (14) defined therethrough. A adjuster nut (16) is inserted through each of the second plurality of holes (14). The spoke adjuster (16) has a shape that is common in the industry, and is herein shown as mushroom shaped. The spoke adjuster has a button head and a shaped tubular section (20), where the shaped tubular section (20) may be hexagonal or square depending on the manufacturer and which is common in the wire wheel industry. The adjuster nut (16) has an internally threaded hole defined therethrough (44), which is also common within the industry.

The wire spokes (8) have an end (22), the end having an externally threaded portion (24). The externally threaded portion (24) of each wire spoke (8) threadably engages each adjuster nut (16), tensioning each wire spoke (8). Each adjuster nut (16) is adjusted to provide the correct tension on each wire spoke (8) making a balanced wheel assembly (1).

A Spoke Seal Protector (26) is shown in FIG. 2. The Spoke Seal Protector (26) is shown having an exterior surface (28) that is shown having a geometric shape, but may be fabricated of any shape. The Spoke Seal Protector (26) is shown with a hole (30) defined therethrough. The hole (30) in the spoke seal protector (26) may be centrally located. The hole (30) is linear along the spoke seal protectors (26) axis. The hole (30) has an upper portion (32), where the upper portion (32) allows the wire spoke (8) to be easily inserted therethrough. The hole (30) additionally has a lower counterbored portion (34), where the lower counterbored portion (34) is positioned at an opposing end (36) of the upper portion (32) defining a cavity. The lower counterbored portion or cavity (34) is sized to allow a clearance fit to the adjuster nut (16). This will provide clearance between the cavity (34) in the spoke seal protector (26) and the adjuster nut (16) for sealant. The spoke seal protector (26) may have an opposing end (36) that may be trimmed or machined at an angle to allow the spoke seal protector (26) to fit more intimately with the wheel rim (2).

Interposed at the opposing end (36) of the spoke seal protector (26) is a gasket (4). The gasket (4) is used to create a moisture and debris barrier to minimize and potentially eliminate intrusion into the counterbored portion (34) of the spoke seal protector (26). An additional benefit of the gasket (4) is that the gasket (4) prevents any sealant from leaking from the counterbored portion (34) of the spoke seal protector (26), thereby eliminating any mess from sealant leakage.

The following disclosures will illustrate the various methods that may be used to secure the spoke seal protector (26) onto the adjustor nut (16).

Figure 4:
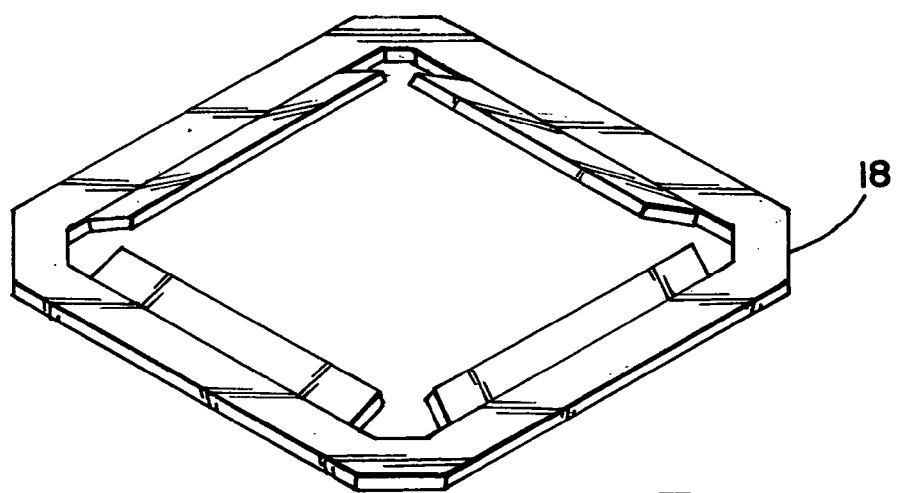
FIG. 4 shows a perspective view of one version of a retaining clip used in the Spoke Seal Protector.

The first disclosed method to secure the spoke seal protector (26) onto the adjuster nut (16), is illustrated in figures two, three and four. The spoke seal protector (26) has a groove (6) defined therein. The groove (6) allows the use of a retaining clip (18). The retaining clip (18) may be a standard in the automotive industry, and is used in a similar fashion. The retaining clip (18) frictionally bears against the nut adjuster (16) securing the spoke seal protector (26) in the desired position on the wire spoke (8). FIG. 4 depicts the standard retaining clip (18) in a square shape, although it is envisioned that any shape, including circular may be used.

Figure 6:
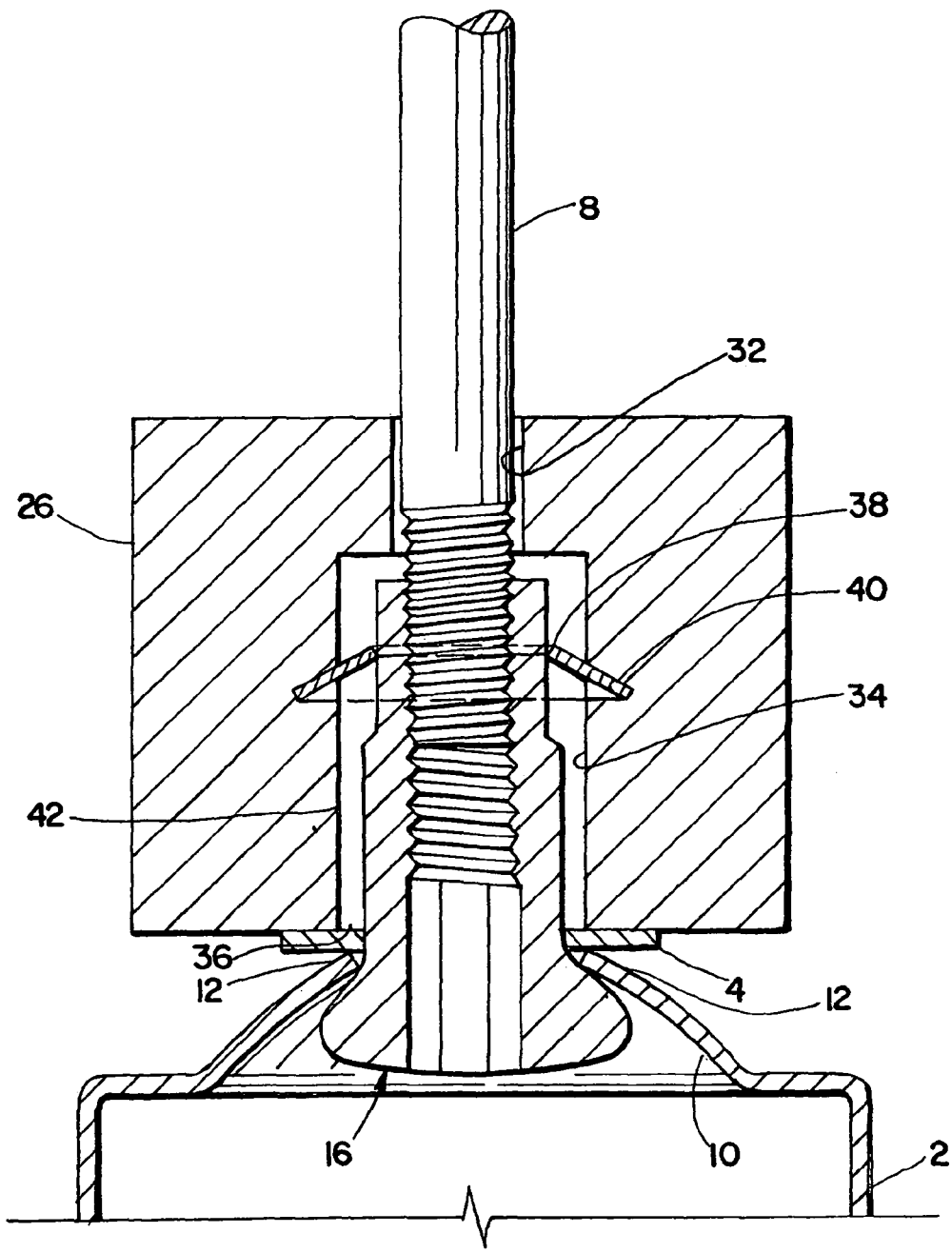
FIG. 6 shows a cross sectional view of a modified Spoke Seal Protector.

FIG. 6 shows an obvious modification to the use of the retaining clip (18). In this embodiment, the nut adjuster (16) is shown having a groove (38) defined therein. The groove (38) allows the insertion of a common retaining clip (40). The retaining clip (40) bears against an inner surface (42) of lower counterbored portion (34) of the spoke seal protector (26) securing the spoke seal protector in place. As has been previously explained, the lower counterbored portion or cavity (34) is sized to allow a clearance fit to the adjuster nut (16), allowing clearance for a sealant. Interposed between the opposing end (36) of the spoke seal protector (26) is a gasket (4). As previously disclosed, the gasket (4) is used to create a moisture and debris barrier to prevent intrusion into the counterbored portion (34) of the spoke seal protector (26).

Figure 7:
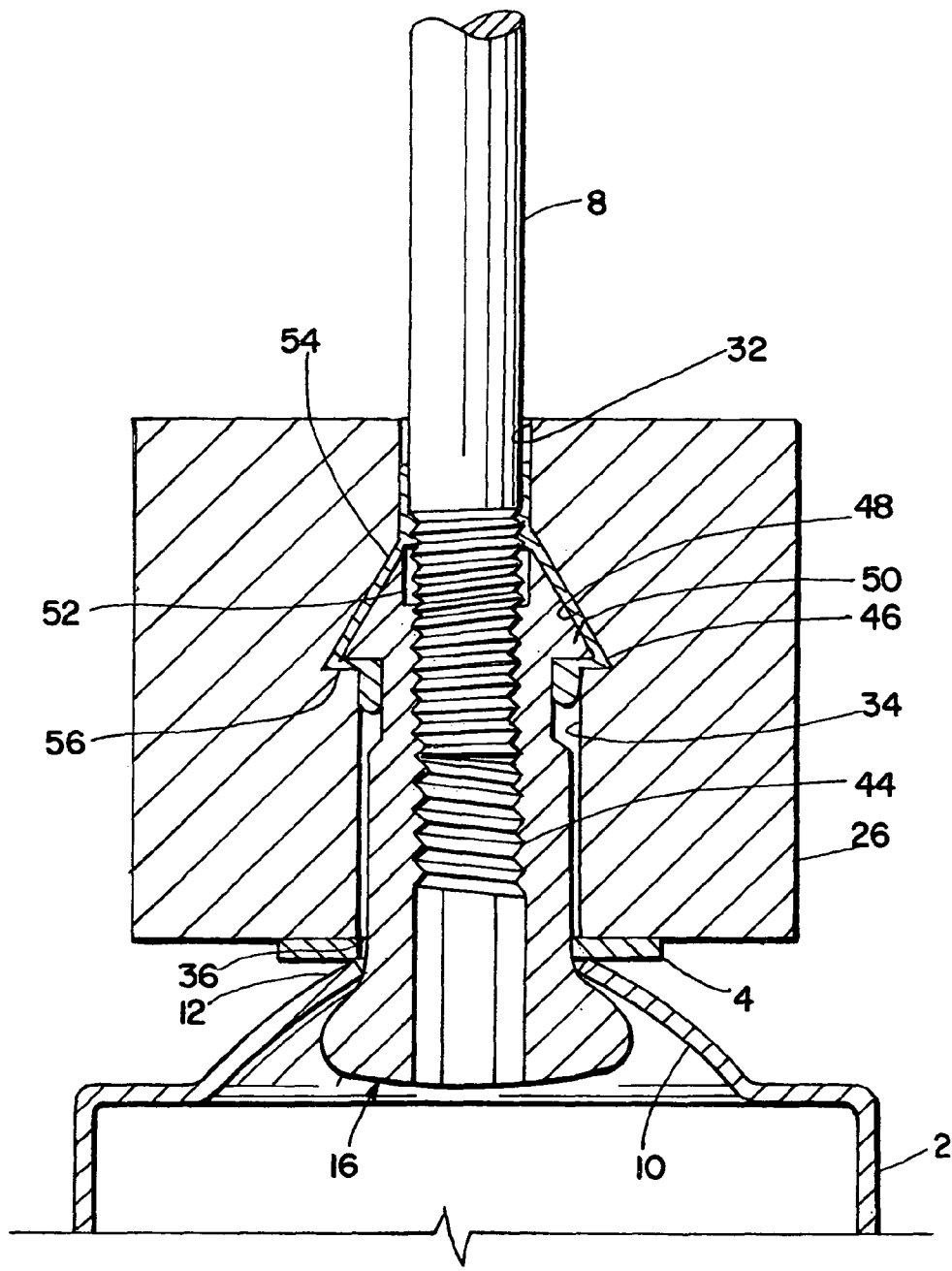
FIG. 7 shows a cross sectional view of a modified Spoke Seal Protector.

FIG. 7 shows another obvious modification to the retaining methods for the spoke seal protector (26). The counterbored portion (34) of the spoke seal protector (26) has an upper portion (46). As depicted in FIG. 7, the upper portion (46) has an arrow shaped cavity (48). The adjuster nut (16) is shown with a complimentary arrow shaped section (50). The arrow shaped section (50) is biased towards an upper portion (52) of the adjuster nut (16). There is a clearance between the arrow shaped section (50) and the arrow shaped cavity (48). This will allow the spoke seal protector (26) to slip over the adjuster nut (16). A shaped grommet (54) is provided to be placed in the upper portion (46) of the arrow shaped cavity (48). The shaped grommet (54) provides enough interference between the arrow shaped cavity (48) and the arrow shaped section (50) so as to create a snug fit between the arrow shaped cavity (48) and the arrow shaped section (50), as well as providing a small ledge (56) for the arrow shaped section (50) to bear against when the spoke seal protector (26) is installed.

Figure 8:
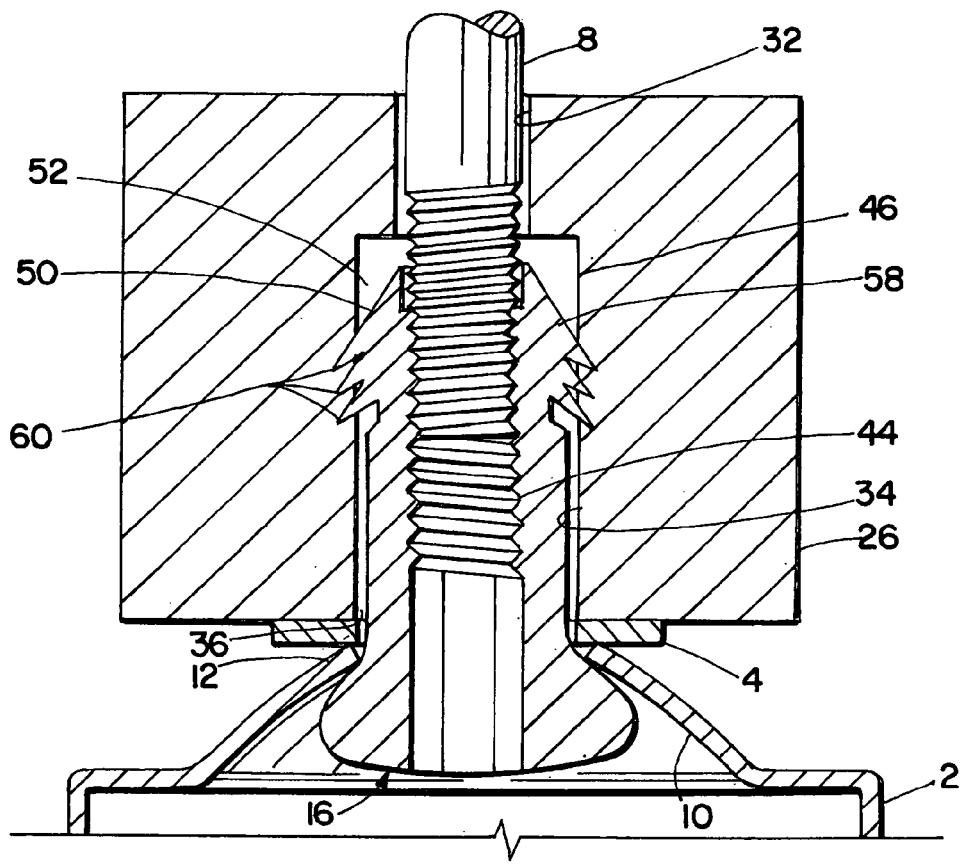
FIG. 8 shows a serrated conical adjuster nut and a complementary shaped Spoke Seal Protector.

FIG. 8 shows an obvious modification to FIG. 7. The counterbored portion (34) of the spoke seal protector (26) has an upper portion (46) that is tubular in shape (58). As depicted in FIG. 8, the upper portion (46) of the adjuster nut (16) has an arrow shaped section (50). Situated below the arrow shaped section (50) are a series of projecting serrations (60). The arrow shaped section (50) and the projection serrations (60) are biased towards an upper portion (52) of the adjuster nut (16). The arrow shaped section (50) and the projection serrations (60) are sized to frictionally bear against the tubular shape (58) of the spoke seal protector (26). A grommet (4) is situated between the spoke seal protector (26) and the wheel rim (2) providing a moisture and debris barrier. Sealant may be inserted into the counterbored portion (34) of the spoke seal protector (26).

Figure 9:
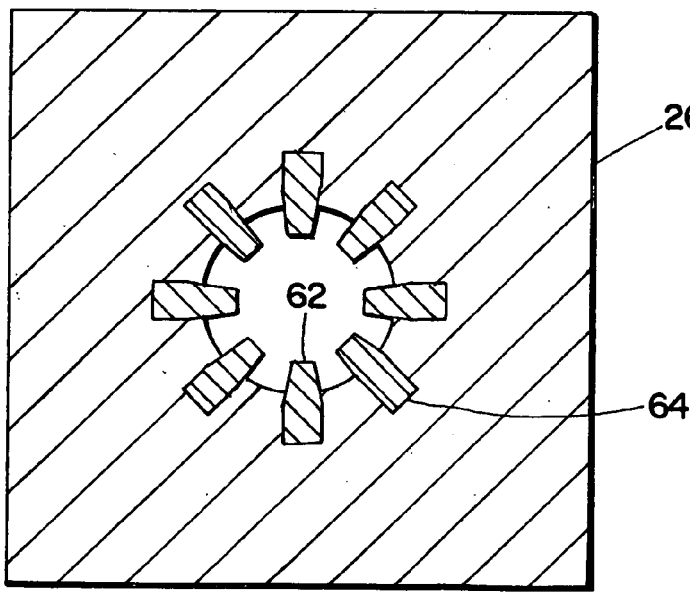
FIG. 9 shows a multi pronged retaining system.

FIG. 9 shows a spoke seal protector (26) that has a series of prongs (62). The series of prongs (62) are inserted within a series of cavities (64) defined within the spoke seal protector (26). The series of prongs (62) frictionally bear against an adjuster nut (16) when installed onto the wheel assembly (1).

Figure 5:
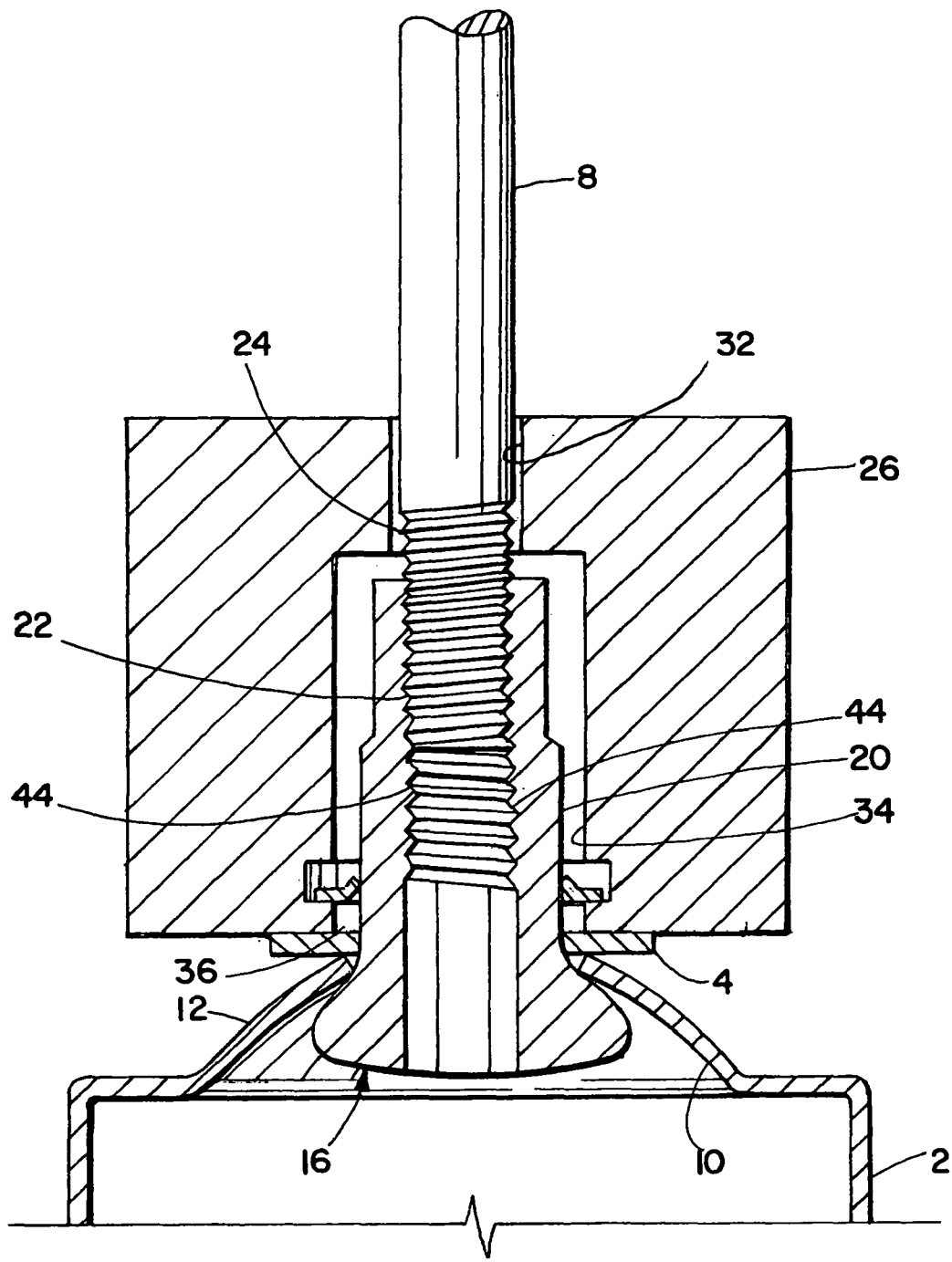
FIG. 5 shows a cross sectional view of a modified Spoke Seal Protector.
Figure 10:
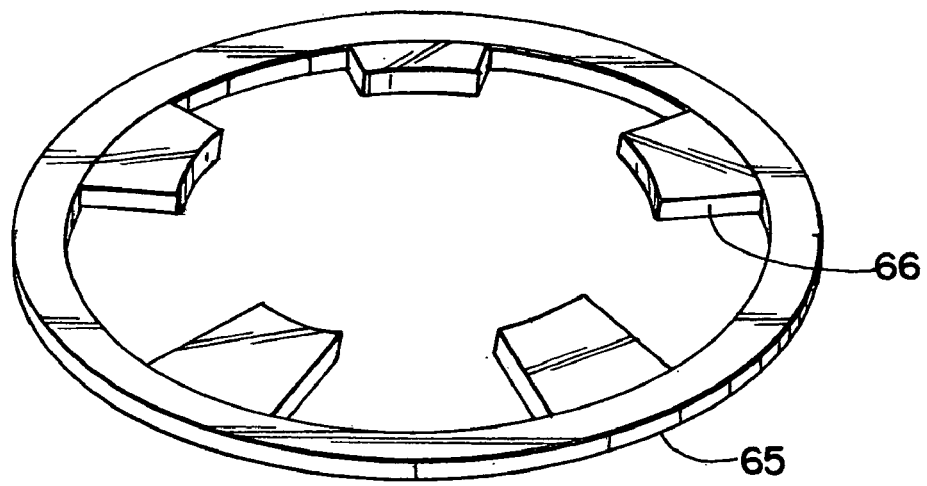
FIG. 10 shows an internally pronged retaining ring that has multiple prongs.

FIG. 10 shows a further embodiment of FIG. 9. A single retaining clip (65) is shown having a series of prongs (66) facing towards each other, creating a restrictive diametrical shape. The retaining clip (65) would be placed in a spoke seal protector (26) that has a groove (68) defined therein (see FIG. 5). The prongs (66) would frictionally bear against the adjuster nut (16), preventing inadvertent movement of the spoke seal protector (26). As shown in FIG. 5, a grommet (4) may be placed at the opposing end (36) of the spoke seal protector (26) and the wheel rim (2).

Figure 11:
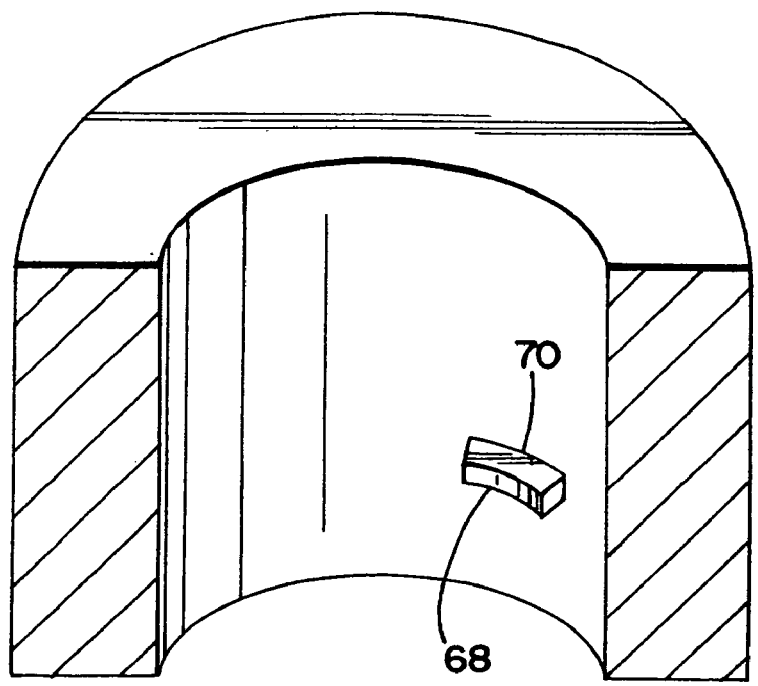
FIG. 11 shows a single prong retaining component mounted in a Spoke Seal Protector.

FIG. 11 shows a simplification of FIGS. 9 and 10. A single prong (68) is secured within a slot (70) placed within the spoke seal protector (26). The prong (68) frictionally bears against the adjuster nut (16), securing the spoke seal protector (26) onto the adjuster nut (16).

Figure 12:
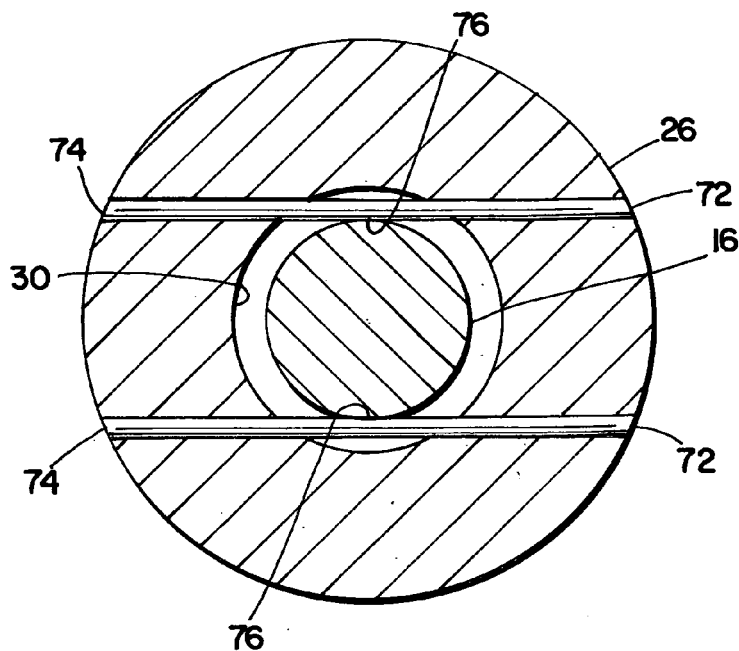
FIG. 12 shows a multi bar retaining system mounted in the Spoke Seal Protector that uses friction to bear against the adjuster nut.
Figure 13:
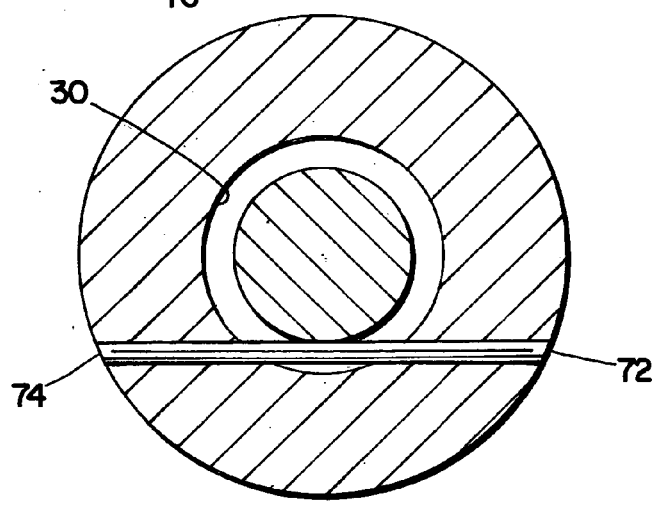
FIG. 13 shows a single bar retaining system mounted in the Spoke Seal Protector that uses friction to bear against the adjuster nut.

FIGS. 12 and 13 show the spoke seal protector (26) having at least 1 retaining rod (72) secured within. The retaining rod (72) is slip fit within a circular hole (74) in the spoke seal protector (26). The retaining rod (72) may penetrate through the exterior of the spoke seal protector (26). The retaining rod (72) penetrates through the hole (30) in the spoke seal protector (26) and creates a restricted area (76) that forces a friction fit between the retaining rod(s) (72), on the adjuster nut (16) securing the spoke seal protector (26) in place.

Figure 14:
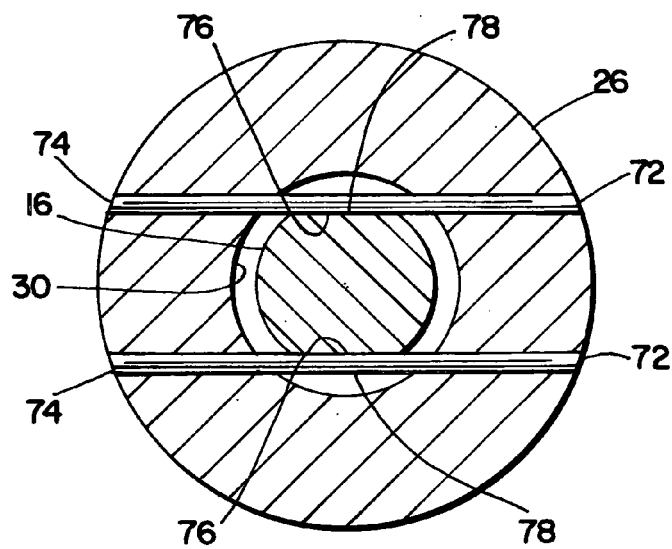
FIG. 14 shows a multi bar retaining system mounted in the Spoke Seal Protector that uses flats on the adjuster nut to secure the Spoke Seal Protector.

FIG. 14 shows that the retaining rod(s) (72) may be secured on an adjuster nut (16) that has defined flat areas (78) thereon.

Figure 15:
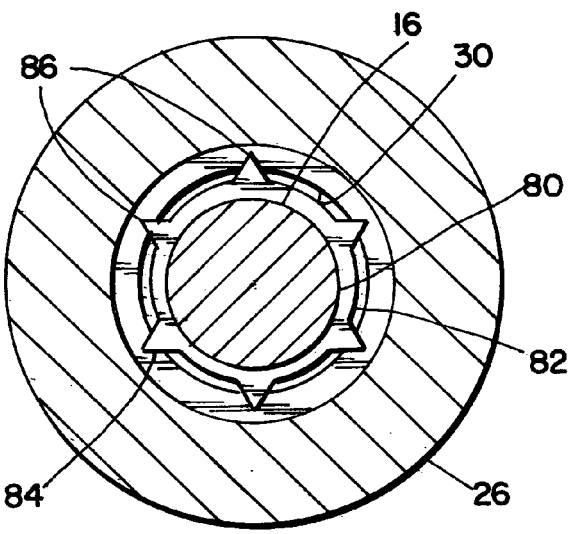
FIG. 15 shows an externally pronged retaining system mounted on the adjuster nut.
Figure 16:
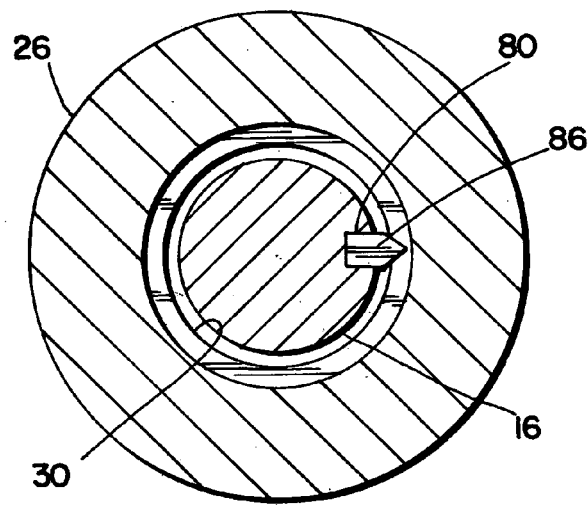
FIG. 16 shows an external single prong retaining system mounted on the adjuster nut.

FIG. 15 shows a modified adjuster nut (16) that has an outer surface (80) with a groove (82) defined therein. The groove (82) allows a retaining ring (84) to be placed therein. The retaining ring (84) is shown having prongs (86), the prongs (86) radiating outwards, and frictionally bearing on the hole (30) in the spoke seal protector (26). FIG. 16 shows a single prong (86) inserted into a slot (88) within the adjuster nut (16), providing a frictional fit onto the hole (30) of the spoke seal protector (26).

Figure 17:
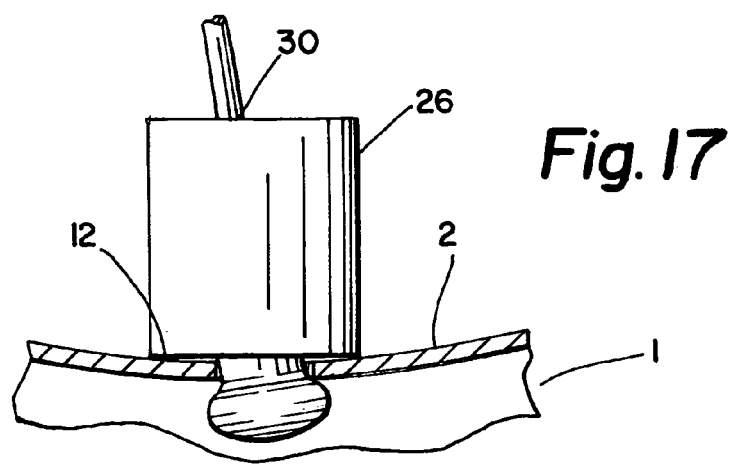
FIG. 17 shows the spoke penetrating the Spoke Seal Protector at angles different than a right angle.

FIG. 17 shows that the hole (30) in the spoke seal protector (26) may be drilled "off axis" to allow the spoke seal protector (26) to sit more flush with the outer tire mounting rim (2) of the wire wheel assembly (1).

Figure 18:
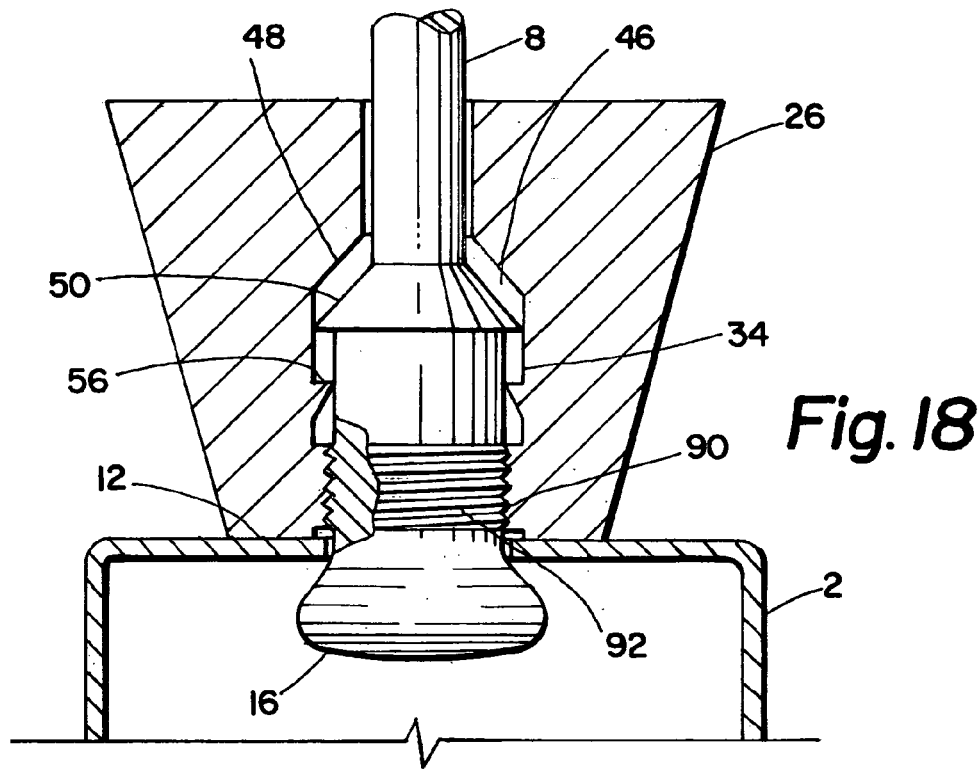
FIG. 18 shows a cross section of the Spoke Seal Protector where the adjuster nut has a conical section and the Spoke Seal Protector has a ledge to prevent the inadvertent dislocation of the Spoke Seal Protector.

FIG. 18 shows another obvious modification to the retaining methods for the spoke seal protector (26). The counterbored portion (34) of the spoke seal protector (26) has an upper portion (46). As depicted in FIG. 18, the upper portion (46) has an arrow shaped cavity (48). The adjuster nut (16) is shown with a complimentary, arrow shaped section (50). The arrow shaped section (50) is biased towards an upper position (52) of the adjuster nut (16). There is a clearance between the arrow shaped section (50) and the arrow shaped cavity (48). This will allow the spoke seal protector (26) to slip over the adjuster nut (16). A small ledge (56) is maintained on the Spoke Seal Protector (26) that will assist in securing the arrow shaped section (50) of the adjuster nut (16). The lower counterbored portion (34) of the Spoke Seal Protector (26) has a knurled surface (90) defined thereon. The spoke adjuster nut (16), additionally, has a complimentary knurled surface (92) defined thereon. The knurled surface (90) on the spoke seal protector (26) and the knurled surface (92) on the adjuster nut (16) create a positive frictional fit securing the Spoke Seal Protector (26) in place on the wire wheel assembly (1).

Figure 19:
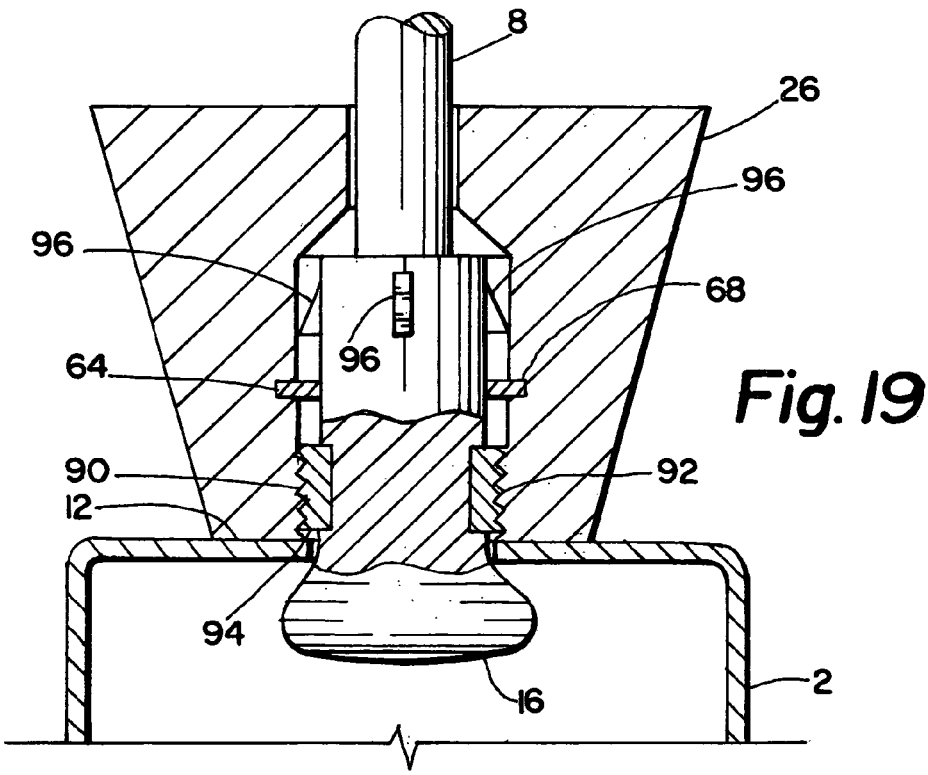
FIG. 19 adds a retaining clip within the Spoke Seal Protector to modify FIG. 18.

FIG. 19 shows that many of the previously defined retaining methods may be combined into a single component. Here the spoke seal protector (26) has a groove (68) that will secure a retaining clip (64). The lower counterbored portion (34) of the spoke seal protector (26) has a knurled surface (90) defined thereon. The spoke adjuster nut (16) additionally has a complimentary knurled surface (92) defined thereon. The complimentary knurled surface (92) on the adjuster nut (16) may be a separate knurled component (94). The adjuster nut (16) is shown with a series of prongs (96) that extend outwards and bear against the hole (30) in the spoke seal protector (26). The separate knurled component (94) is frictionally biased towards the wheel rim and placed on the adjuster nut.

The spoke seal protector (26) is positioned onto the wire spoke (8). The spoke seal protector (26) is slid towards the adjuster nut (16). The spoke seal protector (26) has a lower surface (36), where the lower surface (36) contacts the bearing surface (12) or the wheel rim (2). Sealants based upon silicone, polysulfide, and rubber are a few examples of high performance automotive or industrial sealants that may be used, and also act as a glue, to prevent unwanted dislocation of the spoke seal protector (26) when it is placed in it's final position. The sealant fills the cavity between the spoke seal protector (26) and the wire spoke (8) and the adjuster nut (16), providing a strong environmental seal between the spoke seal protector (26) and the wheel rim (2).

Although the drawings reveal geometric shapes, the inventor also envisions other shapes, such as toy cars, cartoon characters, animal shapes or other similar shapes as alternate shapes that may be used for spoke seal protectors (26). These shapes would have a hole defined therethrough to assure that the surface mating with the wheel rim (2) has a fit that is as intimate as possible.

What is claimed is:

1. A spoke seal protector, comprising:

a. an exterior surface, said exterior surface having a top and a bottom defined thereon, said top of said exterior surface having a hole defined therethrough, said hole being linear and exiting through said bottom of said exterior surface;

b. said hole having a lower counterbored portion, said lower counterbored portion penetrating said bottom of said exterior surface, said lower counterbored portion being positioned in proximity of said bottom of said exterior surface, said lower counterbored portion being adapted to allow a clearance fit to a spoke adjuster;

c. a retaining means, said retaining means securing said spoke seal protector onto an adjuster nut, said retaining means being a series of prongs; and d. said spoke seal protector has a series of cavities defined therein, said series of prongs are inserted within said series of cavities defined within said spoke seal protector, said series of prongs frictionally bear against said adjuster nut when installed onto a wire wheel assembly.

* * * * *